(12) United States Patent  
Kusase

(10) Patent No.: US 6,781,332 B2
(45) Date of Patent: Aug. 24, 2004

(54) ROTARY ELECTRIC APPARATUS FOR VEHICLE

(75) Inventor: Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/265,686

(22) Filed: Oct. 8, 2002

(65) Prior Publication Data

US 2003/0102738 A1 Jun. 5, 2003

(30) Foreign Application Priority Data

Oct. 22, 2001 (JP) .................................. 2001-323597

(51) Int. Cl.[7] .......................... H02K 23/00; H02P 5/28
(52) U.S. Cl. ...................... 318/254; 318/501; 388/922
(58) Field of Search ................ 318/494, 495, 318/498, 502, 505–507, 818, 716, 724, 521–537, 254, 439, 501, 503, 528, 140–158; 388/922, 856

(56) References Cited

U.S. PATENT DOCUMENTS

| | | | | |
|---|---|---|---|---|
| 4,959,573 A | * | 9/1990 | Roberts ..................... | 310/68 R |
| 5,233,577 A | * | 8/1993 | Bakx et al. ............... | 369/13.22 |
| 5,594,332 A | * | 1/1997 | Harman et al. ............. | 324/127 |
| 5,668,458 A | * | 9/1997 | Ueda et al. ................. | 318/716 |
| 6,047,104 A | * | 4/2000 | Cheng ........................ | 388/835 |
| 6,130,494 A | * | 10/2000 | Schob ........................ | 310/90.5 |
| 6,404,089 B1 | * | 6/2002 | Tomion ...................... | 310/162 |
| 6,462,506 B2 | * | 10/2002 | Cochoy et al. ............. | 318/801 |

FOREIGN PATENT DOCUMENTS

| | | | | |
|---|---|---|---|---|
| JP | 03147306 A | * | 6/1991 | ........... H01F/13/00 |

* cited by examiner

*Primary Examiner*—Bentsu Ro
*Assistant Examiner*—Patrick Miller
(74) *Attorney, Agent, or Firm*—Oliff & Berridge, PLC

(57) ABSTRACT

An on-vehicle rotary electric apparatus, such as an on-vehicle generator, is provided. The apparatus comprises a stator having multi-phase windings, a rotor driven to rotate by either an on-vehicle motor or the running drive shaft of a vehicle, and a driving member for driving the field winding. The rotor has a field winding producing a magnetic field. The driving member drives the field winding by supplying the exciting current thereto and changing the exciting current so that the magnetic field rotates differently in a rotation speed from the rotor. Specifically, the driving member comprises a short-circuit winding wound around part of magnetic poles of the rotor and a current-supply unit for supplying, as the exciting current, a single-phase alternating current to the field winding. The short-circuit winding produces a magnetic field delayed in phase by 90 degrees compared to the magnetic field produced by the rotor.

2 Claims, 5 Drawing Sheets t = t1 t = t2 t = t3 t = t4 t = t5

ROTARY ELECTRIC APPARATUS FOR VEHICLE

BACKGROUND OF THE INVENTION

1. Technical Field of the Invention

The present invention relates to a rotary electric apparatus mounted on vehicles such as cars and autotrucks.

2. Description of Related Art

It has been strongly desired that rotary electric apparatuses for vehicles be light in weight and high-performance so that power to be consumed can be minimized. However, it is required for rotary electric apparatuses under operation to change their rotation speeds, which has made it difficult to elevate their performances. For example, in cases where the electric machine is operated as a generator, the number of rotations of the generator is required to continuously changed from approx. 1500 rpm (corresponding to an vehicle's idling state) to approx. 15000 rpm (corresponding to a rotation number in a vehicle's high-speed run). In other words, there is a difference as much as one digit between the upper and lower limits of a range of the number of rotations, so that the rotary electric apparatus under operation is wide in a rotational operation range.

Such a feature that the on-vehicle rotary electric apparatus involves a wide operation range results in contradictory inconveniences as follows. If it is desired that output current be increased at lower idling rotation speeds, one choice is to increase the number of windings of a stator coil. However, when such a measure is adopted, the inductance value of the stator coil is obliged to be larger, resulting in less output current at higher rotation speeds due to the increase in the inner impedance. By contrast, when the number of windings of the stator coil, the output current at higher rotation speeds will be raised, but the output current at lower rotation speeds is forced to be reduced on account of lower inductive voltage.

Meanwhile, when the apparatus is adapted to operate as a motor, the identical situation to the above generator will be posed. To be specific, if the number of windings of a stator coil, a larger torque can be gained at higher rotation speeds due to the fact that a back electromotive force is small. However, at lower rotation speeds, a magnetomotive force is forced to become smaller, so that the torque is made smaller correspondingly. On the other hand, when the number of turns of the stator coil are set to a larger number, the opposite relationship to the above is given.

As described above, the on-vehicle rotary electric apparatus, which can be used as a generator or a motor, requires a wide range of rotation speeds during its operation. Hence there arises the problem that it is very difficult to attain higher output performances at both of lower and higher rotation speeds.

SUMMARY OF THE INVENTION

The present invention has been performed in consideration of the above-described problem, and an object of the present invention is to provide an on-vehicle rotary electric apparatus capable of attaining highly improved output characteristics in both of lower and higher rotation speeds, that is, in the whole rotational speed range.

The present inventor found that, in both the generator and motor, the foregoing problem was attributable to the fact that voltage induced across the stator winding and/or reactance of the stator winding are uniquely proportional to the rotation speed of the rotor. An inventor's study showed that a key to the resolution of the problem was derived from the control of the induced voltage and reactance irrelevantly to the rotation speed of the rotor.

An on-vehicle rotary electric apparatus according to the present invention comprises a stator having multi-phase windings and a rotor having one or more field windings for producing a rotating magnetic field in response to supply of exciting current to the field windings. The rotor is driven to rotate by either an on-vehicle motor or a running drive shaft of a vehicle. The apparatus further comprises a driving member for driving the field windings by supplying the exciting current to the field windings and changing the exciting current so that the rotating magnetic field produced by the rotor rotates at a speed different from a rotation speed of the rotor.

Conventionally, an alternating frequency of N/S magnetic poles has been dependent on the rotation speed of a rotor. However, changing the speed of a rotating magnetic field produced at the rotor allows the alternating frequency of N/S magnetic poles to be changed independently of an actual rotation speed of the rotor. Hence the induced voltage, which is dependent on the frequency of an alternating magnetic field, can be changed separately from an actual number of rotations of the rotor. Also, the reactance of the stator winding depends on the frequency of an alternating magnetic field across the stator winding. Hence, as to this reactance, it can be changed independently of an actual number of rotations of the rotor.

This configuration can be applied to for example an AC generator. When the generator rotates at lower speeds, the rotating magnetic field is accelerated in a rotating direction of the rotor to increase the field. As a result, higher voltage is generated even at lower rotation speeds, thus providing a larger output. By contrast, in cases where the generator is forced to rotate at higher speeds, the rotating magnetic field is prohibited from rotating relatively to the rotor or made to rotate even in the reverse direction to the rotor. Hence a relative speed between the stator armature and the rotating magnetic field can be lowered, thus lessening an armature counteraction (that is, a reactance), thus raising the output.

Preferably, the driving member comprises short-circuit windings wound around part of magnetic poles of the rotor and a current-supply unit for supplying, as the exciting current, a single-phase alternating current to the field windings. Further, the short-circuit windings produce a magnetic field delayed in phase by substantially 90 degrees compared to the magnetic field produced by the rotor. That is, supplying the single-phase alternating current makes it possible to excite the rotor.

Conventionally, in order to obtain the foregoing rotating magnetic field, it was necessary to apply to the rotor winding three-phase alternating current or two-phase alternating current with a phase difference. This current-supplying configuration necessitates the arrangement of many semiconductor switches. In contrast with the conventional, the present invention employs the single-phase alternating current to excite the rotor, thus requiring a less number of semiconductor switches. Concurrently, in order to make it possible that the above single-phase excitation produce a rotating magnetic filed, the short-circuit coils are wound around part of the magnetic poles of the rotor. The short-circuit coils produce a second magnetic field delayed in phase by 90 degrees from the single-phase alternating magnetic field, thereby producing a moving magnetic field, that is, a rotating magnetic field. Compared to the conventional way whereby three-phase alternating current or two-phase alternating current with a phase difference was used to produce the rotating magnetic field, the control of on/off operations of the semiconductor switching elements can be simplified. It is also possible to reduce electrical parts such as semiconductor switches.

Alternatively, the current-supply unit may include an H-type of bridge circuit consisting of four switching elements, two of the four switching elements being connected in a crossed connection to each other with the field windings therebetween, and a field controller for controlling on/off operations of the four switching elements so that the single-phase alternating current passing the field windings change alternately in a passing direction thereof. This circuitry allows a single-phase alternating current to be fed to the field windings, whereby providing the single-phase excitation to the rotor, with the rotating magnetic field still produced.

It is also preferred that the field windings are composed of two partial field windings each of through which the single-phase alternating current is supplied in a one-way direction, in which the one-way direction assigned to each of the partial field windings is different one from the other. In this case, the current-supply unit includes two switching elements each connected to the two partial field windings and a field controller for controlling on/off operations of the two switching elements so that the single-phase alternating current alternately passes through each partial winding in each of the two one-way directions. In particular, this configuration makes it possible to reduce the number of switching elements than the circuitry using the foregoing H-type of bridge circuit.

Still alternatively, the field windings may be connected in parallel to a capacitor so as to form a parallel circuit having a resonant frequency. In this case, the current-supply unit includes a single switching element each connected to the parallel circuit and a field controller for controlling on/off operations of the switching element so that the single-phase alternating current passes through the field windings in synchronism with the resonant frequency. The resonance of the parallel circuit allows the current-supply direction through the field winding to change periodically and the number of switching elements can be minimized.

DETAILED DESCRIPTION OF PREFERRED EMBODIMENTS

Referring to FIGS. 1 to 7, one embodiment of an on-vehicle AC generator, which is employed as a rotary electric apparatus to which the present invention is applied, will now be described.

Figure 1:
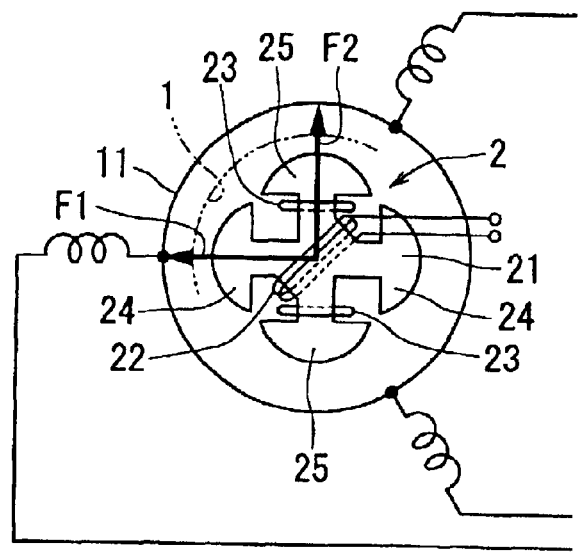
FIG. 1 explains the basic principle employed by an on-vehicle AC generator according to one embodiment of the present invention.
Figure 2:
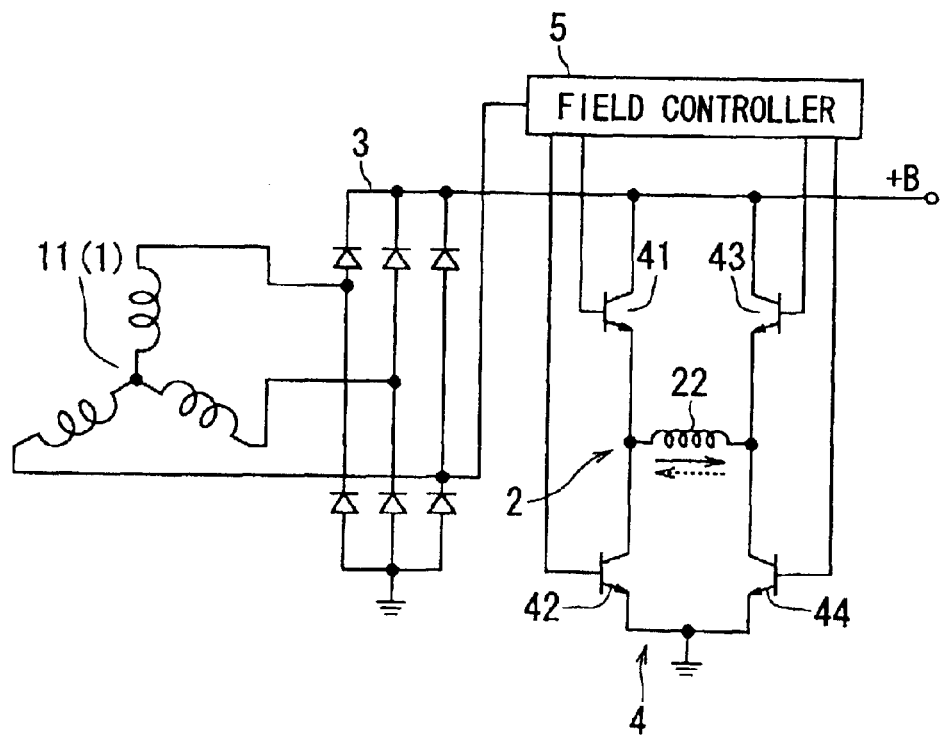
FIG. 2 is a circuit diagram showing the circuitry configuration of the on-vehicle AC generator according to the embodiment.

FIG. 1 shows the basic principle of the on-vehicle AC generator according to the present embodiment, while FIG. 2 shows a practical electrical diagram of the on-vehicle AC generator. The on-vehicle AC generator is equipped with a stator 1, rotor 2, rectifiers 3, H-bridge circuit 4, and field controller 5.

Of these, the rectifiers 3, H-bridge circuit 4, field controller 5, and a short-circuit winding later described constitute the driving member of the present invention. Both of the H-bridge circuit 4 and the field controller 5 further constitutes the current-supply unit of the present invention.

The stator 1 has a not-shown stator core and three-phase stator windings 11, serving as multi-windings, wound around the stator core. The number of turns of the stator windings 11 is less, every phase, than that of a stator winding incorporated in a conventional on-vehicle AC generator. By way of example, the number of turns of the stator windings 11 is set to approximately half of a conventional number of turns.

The rotor 2 is provided with two field cores 21 each having six unguiform magnetic poles and a field winding 22 wound around a boss of the field cores 21. short-circuit windings 23 each wound partly around the unguiform magnetic poles of each of the field cores 21. Thus, part of the unguiform magnetic poles produces first magnetic poles 24 depending on magnetization of the field winding 22, while part of the remaining portion of the unguiform magnetic poles produces second magnetic poles 25 depending on magnetization of the short-circuit windings 23. The rotor 2 is driven by an on-vehicle motor or the running drive shaft of a vehicle, though it is not shown.

Figure 3:
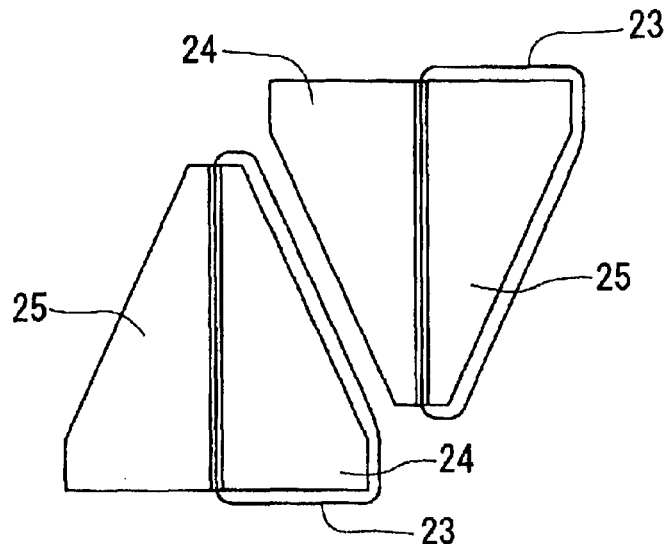
FIG. 3 shows in detail short-circuit windings wound around unguifrom magnetic poles.

FIG. 3 exemplifies in detail the short-circuit windings 23 wound around the unguiform magnetic poles, where only one pair of unguiform magnetic poles is illustrated. In the embodiment, the filed cores 21 are of Rundel type, so that magnetic flux passes both the unguiform magnetic poles and a stator core of the stator 1 positioned so as to face the unguiform magnetic poles. Hence, each short-circuit winding 23 is wound partly around the unguiform magnetic poles so that the short-circuit winding 23 is subject to an almost perpendicular interlinkage of the magnetic flux. As in each unguiform magnetic pole, part thereof surrounded by each short-circuit winding 23 provides the second magnetic pole 25, while the remaining part of each unguiform magnetic pole provides the first magnetic pole 24.

The rectifiers 3 are connected to the stator windings 11 of the stator 2 in order to rectify alternating current induced through the stator windings 11. An output terminal (B terminal) from the rectifiers 3 is coupled with an external electric load and a battery, to which power generated by this generator can therefore be given.

The H-bridge circuit 4 has four electrical switching elements, which are reduced into practice as four transistors 41 to 44. The transistors 41 to 44 are responsible for changing the directions of current passing thorough the field winding 22. One end of the field winding 22 is connected to the two transistors 41 and 42, and the other end is connected to the remaining two transistors 43 and 44. A base of each transistor is linked with the field controller 5.

The field controller 5 functions a switchover element that selectively switches two of the four transistors 41 to 44 to their on-states, so that alternating voltage is applied to the field winding 22 depending on the switchovers. To be specific, in the configuration shown in FIG. 2, controlling the switchovers of the four transistors 41 to 44 allows an exciting current passing through the field coil 22 to be changed in a bi-directional manner. Switchovers of the two transistors 41 and 44 to their on-states, which adopt a diagonal arrangement across the field winding 22, and switchovers of the remaining two transistors 43 and 42 to their off-states enable the exciting current to flow in a direction shown in a solid line arrow in FIG. 2. On the other hand, switchovers of the two transistors 43 and 42 to their on-states and switchovers of the remaining two transistors 41 and 43 to their off-states enable the exciting current to flow in the opposite direction to the solid line arrow, as shown in a dashed line arrow in FIG. 2. The field controller 5 drives the four transistors 41 to 44 so that the exciting currents are switched on or off alternately.

The operations of the on-vehicle AC generator according to the present embodiment will now be described.

Figure 4:
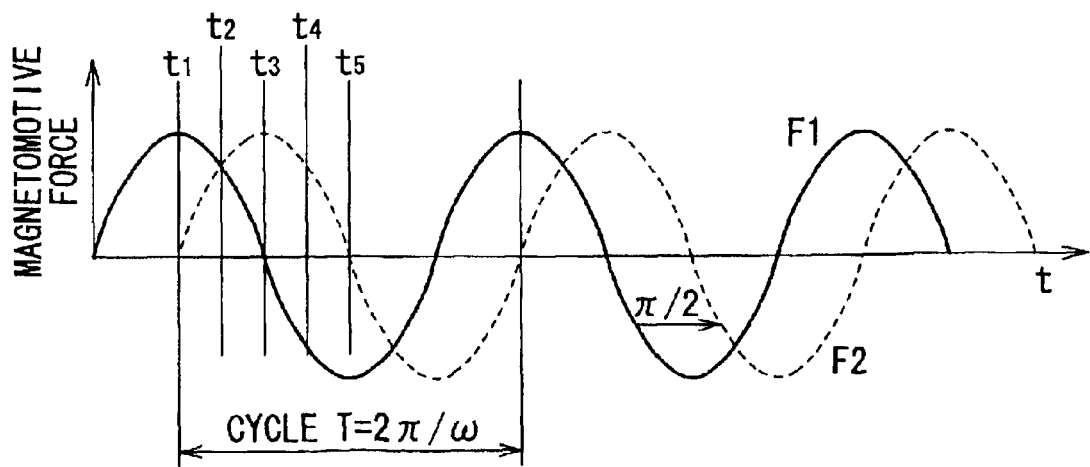
FIG. 4 illustrates the relationship between a magnetomotive force F1 produced at a first magnetic pole and a further magnetomotive force produced at a second magnetic pole.
Figure 5A:
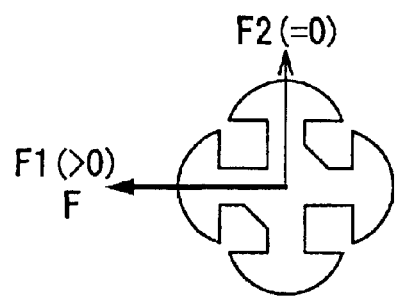
FIGS. 5A to 5E show, respectively, a change in the angle of a synthesized magnetic force F of both the forces F1 and F2 at each timing during one cycle shown in FIG. 4.
Figure 5B:
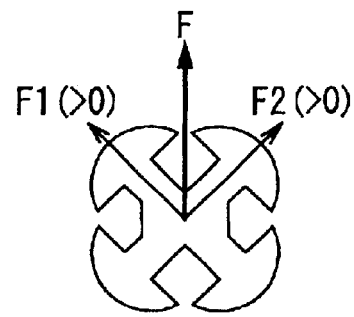
Figure 5C:
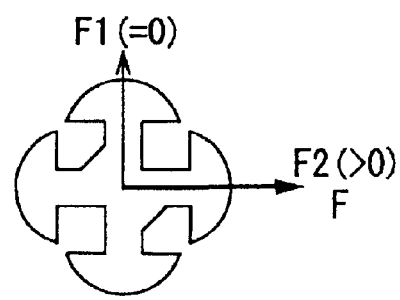
Figure 5D:
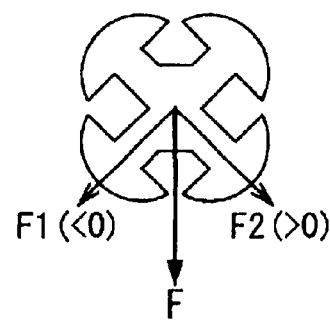
Figure 5E:
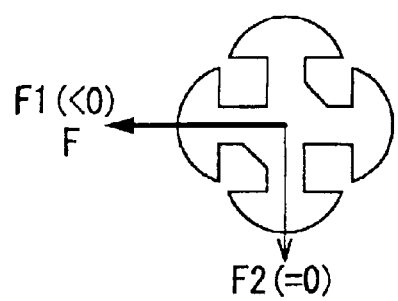

FIG. 4 explains the relationship between a magnetomotive force F1 produced at the first poles 24 around which the field winding 22 is wound and a further magnetomotive force F2 produced at the second poles 25 around which the short-circuit windings 23 is wound. As understood from FIG. 4, the magnetomotive force F2 is delayed in phase by an electrical degree of substantially 90 degrees from the first magnetomotive force F1. Hence a traveling (rotating) magnetic field is generated, which travels from the first poles 24 to the second poles 25.

FIGS. 5A to 5E explain changes in the angle of a synthesized magnetomotive force F of the first and second magnetomotive forces F1 and F2 at each spontaneous timing t (t1 to t5) during one cycle shown in FIG. 1. Incidentally, FIG. 5 shows the field cores 21 that revolve at the same angular velocity at that of the synthesized magnetomotive force F.

As comprehensible from FIGS. 4 and 5A to 5E, during a period from a time instant t=t1 to a further time instant t=t5, the first magnetomotive force F1 produced by the first poles 24 changes from "1, to 0.71, to 0, to –0.71, and to –1," where a peak value of the force F1 is set to 1. By contrast, the second magnetomotive force F2 produced by the second poles 25 changes from "0, to 0.71, to 1, to 0.71, and to 0." Hence, the total force F, which is obtained by synthesizing the two forces F1 and F2, shows its changes shown in FIGS. 5A to 5E, thereby generating a rotating magnetic field that rotates at the same angular velocity as the frequency of an AC voltage to be applied to the field winding 22.

Through the H-bridge circuit 4, each pair of crossed transistors 41 and 44 (or 43 and 42) is turned on alternately, thereby allowing the single-phase alternating current to flow through the field winding 22. The frequency of the alternating current is controlled so that the frequency can be changed every range of rotation speeds correspondingly to the number of rotations of the generator that changes dependently on its running states.

Figure 6:
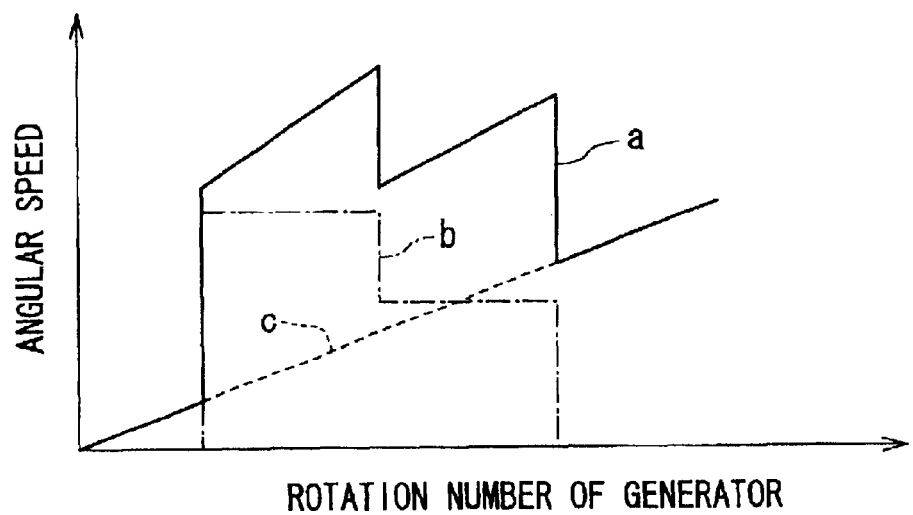
FIG. 6 explains the relationship between the number of rotations of a generator and its exciting angular velocities.

FIG. 6 shows the relationship between the number of rotations of the generator and an exciting angular velocity, where a solid line La depicts the exciting angular velocity, a chain line Lb depicts a relative exciting angular velocity compared to the rotor 2, and a dotted line Lc depicts the angular velocity of the rotor 2, respectively.

As shown in FIG. 6, in the on-vehicle AC generator according to the present embodiment, the exciting angular velocity is set to values relatively larger than the angular velocity of the rotor 2, in cases where the vehicle runs at slower speeds including its idling speed, as shown by the line Lb. For example, the relative exciting angular velocity is set to 150 Hz (i.e., 150 rev/s). When the vehicle idles at 1500 rpm, the field winding 11 itself is in dynamic rotation of 150 Hz (i.e., 150 rev/s). This means that, when observed from the stator winding 11, a rotating magnetic field produced by the field cores 21 becomes 300 Hz (150+150 Hz), so that the generation will be made as if the number of rotations of the field cores 21 is double. That is, in the case of the present embodiment, although the number of turns of the stator winding 11 is reduced to almost half of the conventional one, an output voltage nearly equal to the conventional can be generated, provided that the number of rotations of the field windings 21 is the same.

Moreover, on the basis of the frequency of a generated signal detected by a frequency detector (not-shown) arranged in the field controller 5, the relative exciting angular velocity to the field cores 21 is lowered stepwise (three stepwise in the example shown in FIG. 6). Hence, at higher rotations, the alternating current supply is changed into direct current supply. This allows the exciting angular velocity to reduce from a velocity as much as an approximately doubled dynamic rotation of the field cores 21, down to the same velocity as that of the field cores 21. Hence depending on a reduction, compared to the conventional, in the exciting angular velocity or a reduction in the number of turns of the stator winding 11, the amount of the reactance of the stator winding 11 reduces as well. Since the inner impedance is lowered, the output becomes larger.

Figure 7:
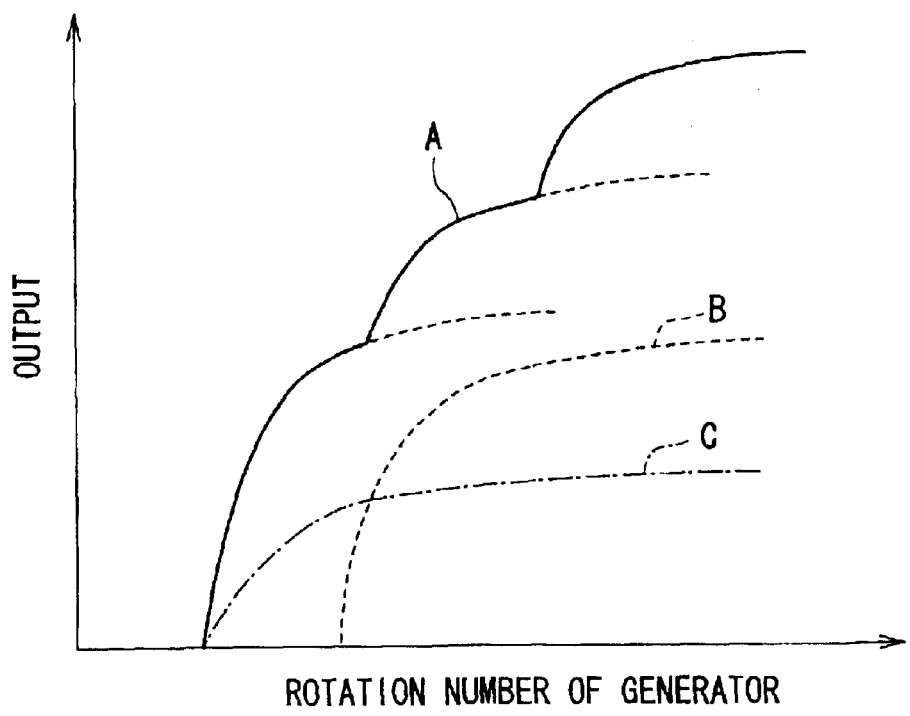
FIG. 7 explains an output characteristic of the on-vehicle AC generator according to the present embodiment.

FIG. 7 illustrates various output characteristics relating to the on-vehicle AC generator according to the present embodiment. In FIG. 7, a solid line LA depicts the output characteristic of the on-vehicle AC generator, while a dotted line LB depicts an output characteristic obtained by applying direct-current excitation to the on-vehicle AC generator. And a dashed line LC explains the output characteristic of a conventional on-vehicle AC generator, in which the number of turns of its stator windings is increased so that the conventional generator becomes equal in a rising number of rotations to that of the generator according to the present embodiment.

As understood from FIG. 7, when the on-vehicle AC generator rotates at lower speeds that include idling speeds, the frequency of a rotary magnetic field that is generated responsively to the rotation of the rotor 2 is assigned to amounts larger than an actual number of rotations of the rotor 2. Hence a sufficient output characteristic can be obtained at lower speeds. On the other hand, the number of turns of the stator winding 11 is less than the conventional one, resulting in that a satisfactory output characteristic can be given at even higher rotation speeds. Therefore, according to the on-vehicle AC generator of the present embodiment, the output characteristics can be improved at both the lower and higher speeds, so that the generator operates steadily in an excellent output condition when mounted on vehicles whose rotation speed changes widely from lower to higher speeds.

The present invention is not restricted to the constructions shown in the foregoing embodiment, but a person having ordinary skill in the art can create a variety of constructions adequately altered or deformed within the scope of the claims.

For example, in the foregoing embodiment, to apply alternating voltage to the field winding 22 so as to generate the single-phase alternating magnetic field, the H-bridge circuit 4 may be replaced by other appropriate circuits.

Figure 8:
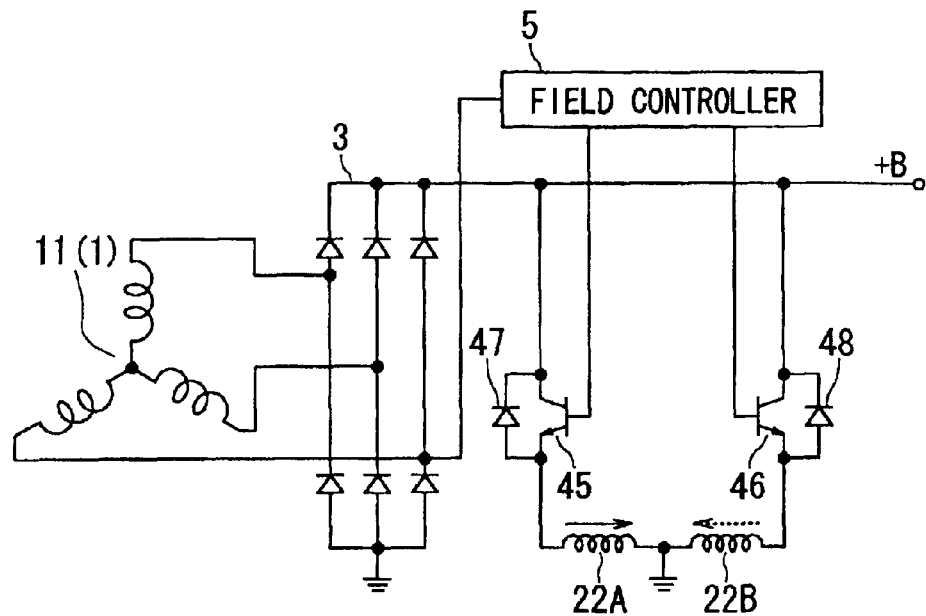
FIG. 8 is another circuit diagram showing the circuitry configuration of the on-vehicle AC generator according to the embodiment, in which an alternate magnetic field is produced through the rotor.

Moreover, FIG. 8 shows another example of the on-vehicle AC generator in which the rotor 2 is configured so as to generate the alternating magnetic field. In the generator shown in FIG. 8, instead of the H-bridge circuit 4, an alternative circuit can be placed, in which there are two field windings 22A and 22B whose winding directions are opposite to each other. Each of the two field windings 22A and 22B is connected to the field controller 5 and the +B power line via each of two transistors 45 and 46, which are connected in parallel to circulating diodes 47 and 48, respectively. The field controller 5 makes turn on the two transistors 45 and 46 alternately, so that current flows alternately through the field windings 22A and 22B along their respective one-way directions, as shown by solid and dashed lines. Each of the diodes 47 and 48 allows a circulatory current to flow therethrough during turning off each of the transistors 47 and 48.

According to this configuration, the number of transistors acting as the switching elements can be reduced to half of the number of such elements adopted by the configuration shown in FIG. 2, thus being advantageous in saving a production cost.

Figure 9:
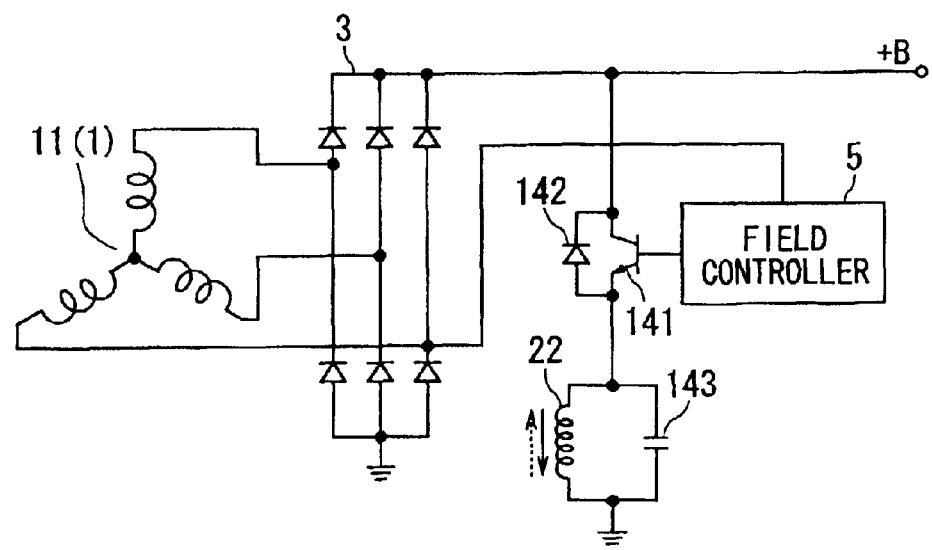
FIG. 9 is still another circuit diagram showing the circuitry configuration of the on-vehicle AC generator according to the embodiment, in which an alternate magnetic field is produced through the rotor.

FIG. 9 shows another example of the on-vehicle AC generator in which the rotor 2 is produced so as to generate the alternate magnetic field. In the generator shown in FIG. 9, instead of the H-bridge circuit 4, an alternative circuit can be placed, in which a capacitor 143 is connected to the field winding 22 and this parallel circuit is connected to both of the filed controller 5 and the +B power line. A circulating diode 142 is coupled in parallel with the transistor 141. Controlling the on/off operations of the transistor 141 in synchronism with the resonant frequency of the parallel circuit made by the field winding 22 and capacitor 143 enables alternating current to flow through the field winding 22, as shown by solid and dashed lines. The diode 142 allows a circulatory current to flow therethrough during turning off the transistor 141.

Thanks to this circuitry, the number of transistors employed as the switching elements is reduced to one, thus providing an advantage to the production cost. Additionally, to reduce the number of parts makes assembling work easier. Further, because the number of transistors that should be turned on and off is only one, facilitating control of the transistors.

Although the above embodiment and modifications have been described about the on-vehicle AC generator employed as one embodiment of the on-vehicle rotary electric apparatus according to the present embodiment, but the on-vehicle rotary electric apparatus can also be practiced into a on-vehicle motor.

The present invention may be embodied in other specific forms without departing from the spirit or essential characteristics thereof. The above embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An on-vehicle rotary electric apparatus, comprising;

a stator configured to be equipped with multi-phase windings;

a rotor configured to have magnetic poles and to be equipped with two partial field windings for producing a magnetic field in response to supply of an exciting current to the field windings, the rotor being driven to rotate by an on-vehicle driving source, a single-phase alternating current being supplied through each of the two partial field windings in a one-way direction, the one-way direction assigned to each of the partial field windings being different one from the other;

short-circuit windings wound around part of the magnetic poles of the rotor so that the short-circuit windings produce a further magnetic field delayed in phase by substantially 90 degrees compared to the magnetic field produced by the field windings; and a current-supply unit for supplying the single-phase alternating current to the field windings, wherein the current-supply unit includes two switching elements each connected to the two partial field windings and a field controller controlling on/off operations of the two switching elements so that the single-phase alternating current alternately passes through each partial winding in each of the two one-way directions.

2. An on-vehicle rotary electric apparatus, comprising;

a stator configured to be equipped with multi-phase windings;

a rotor configured to have magnetic poles and to be equipped with a field winding for producing a magnetic field in response to supply of an exciting current to the field winding, the rotor being driven to rotate by an on-vehicle driving source;

short-circuit windings wound around part of the magnetic poles of the rotor so that the short-circuit windings produce a further magnetic field delayed in phase by substantially 90 degrees compared to the magnetic field produced by the field winding;

a capacitor connected in parallel to the field winding to form a parallel circuit consisting of the field winding and the capacitor to provide a resonant frequency; and a current-supply unit for supplying, as the exciting current, a single-phase alternating current to the field winding, wherein the current-supply unit is equipped with a single switching element connected to the parallel circuit and a field controller controlling on/off operations of the switching element so that the single-phase alternating current passes through the field winding in synchronism with the resonant frequency.

* * * * *